United States Patent
Abe et al.

(10) Patent No.: US 10,225,576 B2
(45) Date of Patent: Mar. 5, 2019

(54) VIDEO CODING APPARATUS AND VIDEO CODING METHOD

(71) Applicant: Panasonic Intellectual Property Management Co., Ltd., Osaka (JP)

(72) Inventors: Kiyofumi Abe, Osaka (JP); Kazuhito Kimura, Shiga (JP); Hideyuki Ohgose, Osaka (JP); Hiroshi Arakawa, Nara (JP); Koji Arimura, Osaka (JP); Kazuma Sakakibara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 326 days.

(21) Appl. No.: 14/641,086

(22) Filed: Mar. 6, 2015

(65) Prior Publication Data
US 2015/0256851 A1     Sep. 10, 2015

(30) Foreign Application Priority Data

Mar. 6, 2014  (JP) .................... 2014-043540
Feb. 25, 2015  (JP) .................... 2015-035041

(51) Int. Cl.
*H04N 19/61* (2014.01)
*H04N 19/593* (2014.01)
(Continued)

(52) U.S. Cl.
CPC ........... *H04N 19/593* (2014.11); *H04N 19/51* (2014.11); *H04N 19/61* (2014.11); *H04N 19/124* (2014.11)

(58) Field of Classification Search
CPC .... H04N 19/124; H04N 19/51; H04N 19/593; H04N 19/61; H04N 19/115; H04N 19/137; H04N 19/169; H04N 19/88
(Continued)

(56) References Cited

U.S. PATENT DOCUMENTS 8,295,355 B2 * 10/2012 Lee .................. H04N 19/44
                                              375/240.12
9,020,032 B2 * 4/2015 Lim .................. H04N 19/573
                                              375/240.15
(Continued)

FOREIGN PATENT DOCUMENTS

JP      2013-545372     12/2013
WO      2013/128010     9/2013

OTHER PUBLICATIONS

"Recommendation ITU-T H.265: High efficiency video coding", Telecommunication Standardization Sector of ITU and ISO/IEC JTC 1-SC 29/WG 11(MPEG), International Telecommunication Union, Apr. 2013, 317 pages.

(Continued)

*Primary Examiner* — Christopher S Kelley
*Assistant Examiner* — Kathleen M Walsh
(74) *Attorney, Agent, or Firm* — Wenderoth, Lind & Ponack, L.L.P.

(57) ABSTRACT

A video coding apparatus including a dividing part that outputs the coding target picture divided for each coding unit (basic CU); a prediction processor that generates a prediction image by performing one of intra prediction and inter-screen prediction; a difference calculator that generates a difference image by calculating a difference between the generated prediction image and an image corresponding to the prediction image in the coding target picture; a residual coder that generates a residual coefficient by performing transform processing and quantization processing on the generated difference image; an integration unit that integrates a plurality of basic CUs included in an N×N-pixel region into one new CU, and a code string generator that generates a code string corresponding to the post-integration (Continued)

| Basic block size | Basic CU size | Basic PU size | Basic TU size | |
|---|---|---|---|---|
| 16×16 | 16×16 | 16×16 | 16×16 | Integration → determination target |
| | | 16×8,8×16 (Only inter prediction) | 8×8 | |
| | 8×8 | 8×8 | 8×8 | |
| | | 8×4,4×8 (Only inter prediction) | 4×4 | |
| | | 4×4 (Only intra prediction) | 4×4 | | new CU by performing variable-length coding and arithmetic coding on coding information and the residual coefficient.

4 Claims, 13 Drawing Sheets

(51) Int. Cl.
*H04N 19/51* (2014.01)
*H04N 19/124* (2014.01)

(58) Field of Classification Search
USPC .......................... 375/240.12, 240.13, 240.24
See application file for complete search history.

(56) References Cited

U.S. PATENT DOCUMENTS

| | | | | |
|---|---|---|---|---|
| 2012/0128067 A1* | 5/2012 | Liu | .................... | H04N 19/159 |
| | | | | 375/240.12 |
| 2012/0294365 A1* | 11/2012 | Zheng | ................ | H04N 19/176 |
| | | | | 375/240.16 |
| 2013/0016783 A1* | 1/2013 | Kim | .................... | H04N 19/176 |
| | | | | 375/240.13 |
| 2013/0016787 A1* | 1/2013 | Kim | .................... | H04N 19/176 |
| | | | | 375/240.16 |
| 2013/0022129 A1* | 1/2013 | Liu | .................... | H04N 19/44 |
| | | | | 375/240.23 |
| 2013/0034152 A1* | 2/2013 | Song | .................. | H04N 19/119 |
| | | | | 375/240.03 |
| 2013/0148739 A1* | 6/2013 | Lee | .................... | H04N 19/44 |
| | | | | 375/240.18 |
| 2013/0215968 A1 | 8/2013 | Jeong et al. | | |
| 2013/0322542 A1* | 12/2013 | Senzaki | .......... | H04N 19/00587 |
| | | | | 375/240.16 |
| 2014/0050263 A1* | 2/2014 | Kim | ................ | H04N 19/00763 |
| | | | | 375/240.13 |
| 2014/0064373 A1* | 3/2014 | Le Leannec | ..... | H04N 19/00424 |
| | | | | 375/240.16 |
| 2014/0126645 A1* | 5/2014 | Lim | .................... | H04N 19/105 |
| | | | | 375/240.16 |
| 2014/0133575 A1* | 5/2014 | Lee | .................... | H04N 19/105 |
| | | | | 375/240.24 |
| 2014/0140395 A1* | 5/2014 | Kim | ................ | H04N 19/00212 |
| | | | | 375/240.03 |
| 2014/0286419 A1* | 9/2014 | Cheon | .................... | H04N 19/13 |
| | | | | 375/240.13 |
| 2015/0016521 A1* | 1/2015 | Peng | ................ | H04N 19/00569 |
| | | | | 375/240.12 |
| 2015/0063460 A1* | 3/2015 | Gamei | ................ | H04N 19/122 |
| | | | | 375/240.18 |

OTHER PUBLICATIONS

Boss, B., et al.: "High Efficiency Video Coding (HEVC) text specification draft 10 (for FDIS & Last Call)", Joint Collaborative Team on Video Coding (JCT-VC) of ITU-T SG 16 WP 3 and ISO/IEC JTC 1-SC 29/WG 11, 12th Meeting, Geneva, CH, Jan. 14-23, 2013, 310 pages.

* cited by examiner

FIG. 1

| CU size | PU size | TU size |
|---|---|---|
| 64×64 | 64×64,64×32,32×64, 32×32,64×16,64×48, 16×64,48×64 | 32×32,16×16, 8×8,4×4 |
| 32×32 | 32×32,32×16,16×32, 16×16,32×8,32×24, 8×32,24×32 | 32×32,16×16, 8×8,4×4 |
| 16×16 | 16×16,16×8,8×16, 8×8,16×4,16×12, 4×16,12×16 | 16×16,8×8, 4×4 |
| 8×8 | 8×8,8×4,4×8,4×4 | 8×8,4×4 |

FIG. 6

| | CU size | PU size | TU size |
|---|---|---|---|
| Integrated CU | 32×32 | 32×32 | 16×16 |
| | 16×16 | 16×16 | 16×16 |
| Basic CU | 8×8 | 16×8, 8×16 (Only inter prediction) | 8×8 |
| | | 8×8 | 8×8 |
| | | 8×4, 4×8 (Only inter prediction) | 4×4 |
| | | 4×4 (Only intra prediction) | 4×4 |

FIG. 9

| Integrated CU size | Integrated PU size | Condition of prediction information | |
|---|---|---|---|
| 32×32 | 32×32 | Pieces of prediction information on four basic PUs are identical to one another | A A / A A |
| | 32×16 (Only inter prediction) | Pieces of prediction information on two sets of basic PUs horizontally adjacent to each other are identical to each other | A A / B B |
| | 16×32 (Only inter prediction) | Pieces of prediction information on two sets of basic PUs vertically adjacent to each other are identical to each other | A B / A B |

FIG. 10

| CU size | PU size | TU size |
|---|---|---|
| 32×32 | 32×32 | 16×16 |
| | 32×16, 16×32 (Only inter prediction) | 16×16 |
| 16×16 | 16×16 | 16×16 |
| | 16×8, 8×16 (Only inter prediction) | 8×8 |
| 8×8 | 8×8 | 8×8 |
| | 8×4, 4×8 (Only inter prediction) | 4×4 |
| | 4×4 (Only intra prediction) | 4×4 |

Integrated CU: 32×32, 16×16
Basic CU: 8×8

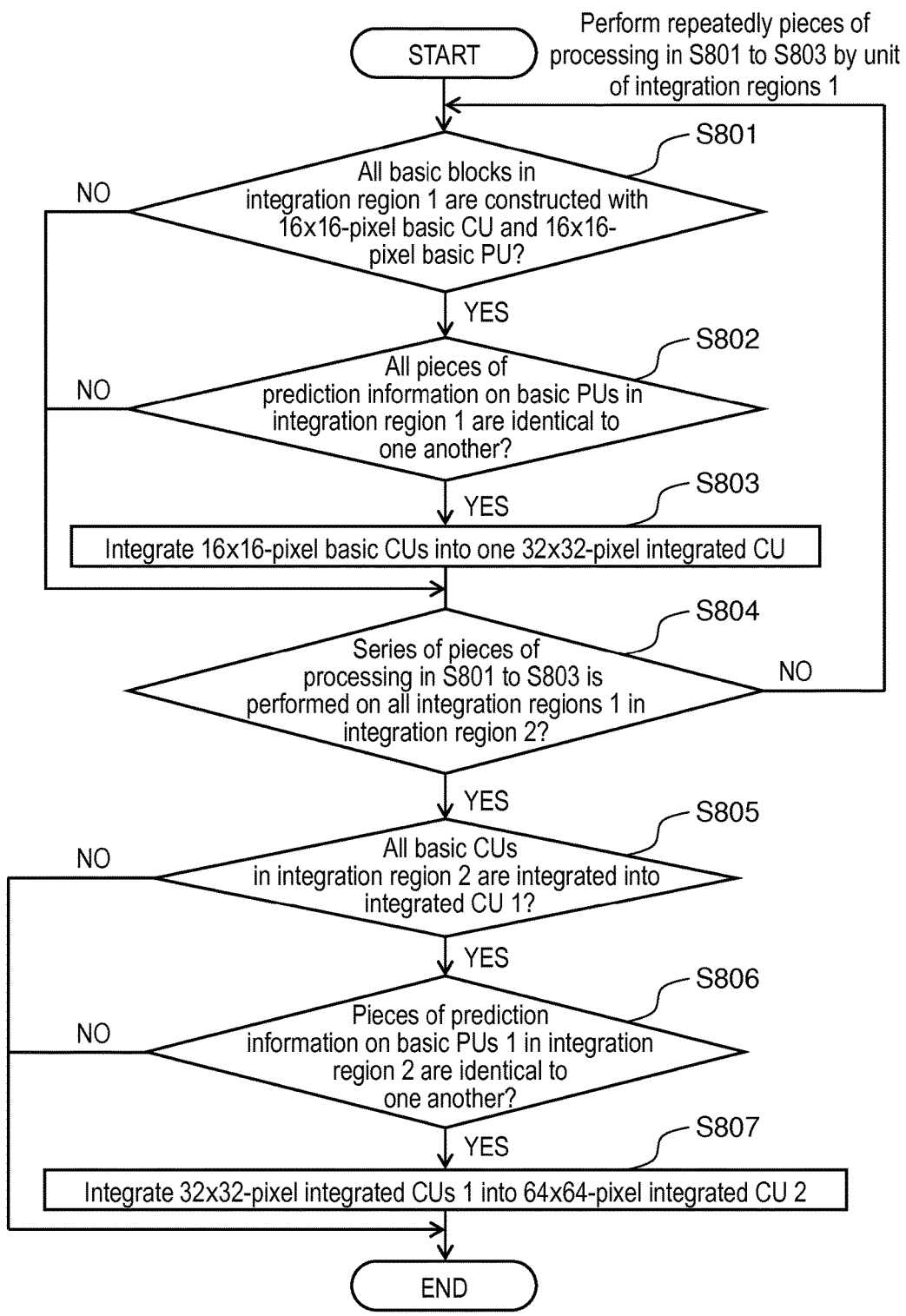

FIG. 13

| | CU size | PU size | TU size |
|---|---|---|---|
| Integrated CU 2 | 64×64 | 64×64 | 16×16 |
| Integrated CU 1 | 32×32 | 32×32 | 16×16 |
| Basic CU | 16×16 | 16×16 | 16×16 |
| | | 16×8, 8×16 (Only inter prediction) | 8×8 |
| | 8×8 | 8×8 | 8×8 |
| | | 8×4, 4×8 (Only inter prediction) | 4×4 |
| | | 4×4 (Only intra prediction) | 4×4 |

VIDEO CODING APPARATUS AND VIDEO CODING METHOD

RELATED APPLICATIONS

This application claims the benefit of Japanese Application No. 2014-043540, filed on Mar. 6, 2014 and Japanese Application No. 2015-035041, filed on Feb. 25, 2015, the disclosures of which Applications are incorporated by reference herein.

BACKGROUND

1. Field

The present disclosure relates to a video coding apparatus and a video coding method for coding an input image while dividing the input image into blocks.

2. Description of the Related Art

Nowadays, unified treatment of all pieces of media information such as an image, a sound, and a text becomes general with the progress of multimedia application. Because a digitized image has a huge data amount, an image information compression technology is required to store and transmit the image. At the same time, standardization of the compression technology is also required in order to mutually use the compressed image data. For example, H.261, H.263, and H.264 of ITU-T (International Telecommunication Union Telecommunication Standardization Sector) and MPEG-1, MPEG-3, MPEG-4, and MPEG-4AVC of ISO/IEC (International Organization for Standardization) are well known as a standard for video compression technology. A standardization activity of a next-generation video coding system called HEVC (High Efficiency Video Coding) is currently progressed by a cooperation of ITU-T and ISO/IEC.

In video coding, each coding target picture is divided into blocks which are coding units, and an information amount is compressed by reducing redundancies in temporal and spatial directions in each block. In intra prediction coding aimed at the reduction of the spatial redundancy, a prediction image is generated from pixel information on the surrounding already-coded block to acquire a difference image between the obtained prediction image and a coding target block. In inter-screen prediction coding aimed at the reduction of the temporal redundancy, motion detection and generation of a prediction image are performed by block unit by referring to the picture in which the coding is already completed forward or rearward, and the difference image between the obtained prediction image and a coding target block is acquired. Transform processing such as a discrete cosine transform and quantization processing are performed on the obtained difference image, and a code string is generated using variable-length coding and arithmetic coding, thereby compressing the information amount.

FIG. 1 is a conceptual view illustrating a combination of block sizes defined in the HEVC standard. In the HEVC (ITU-T H.265 (April 2013)) standard, as illustrated in FIG. 1, any size can be selected and used from four kinds of block sizes, namely, 64×64 pixels, 32×32 pixels, 16×16 pixels, and 8×8 pixels as a coding unit (hereinafter, referred to as a "CU (Coding Unit)").

For example, in the case that a CU size has 32×32 pixels, as illustrated in FIG. 1, any size can be selected and used from eight kinds of block sizes such as 32×32 pixels, 16×32 pixels, and 16×16 pixels as a prediction unit (hereinafter, referred to as a "PU (Prediction Unit)") that is of a unit obtained by dividing the CU. The PU generates a prediction image in the intra prediction coding and the inter-screen prediction coding. For example, a smaller block size is used in the image in which motion of an imaging object is complicated, and a larger block size is used in the image in which the motion of an imaging object is simple, thereby achieving high coding efficiency.

For example, in the case that the CU size has 32×32 pixels, as illustrated in FIG. 1, any size can be selected and used from four kinds of block sizes of 32×32 pixels, 16×16 pixels, 8×8 pixels, and 4×4 pixels as an transform unit (hereinafter, referred to as a "TU (Transform Unit)") that is of a unit obtained by dividing the CU. The TU is used in the transform processing and the quantization processing. For example, a smaller block size is used in the image in which a characteristic varies in a fine range, and a larger block size is used in the image in which the characteristics are identical to each other in a wide range, thereby achieving the high coding efficiency.

SUMMARY

An object of the present disclosure is to provide a video coding apparatus that improves the coding efficiency without increasing a processing amount while suppressing code amounts of pieces of header information on a CU layer and a PU layer.

According to one aspect of the present disclosure, a video coding apparatus codes a coding target picture according to a predetermined coding standard to generate a code string. The video coding apparatus includes: a dividing part that outputs the coding target picture divided for each coding unit (basic CU); a prediction processor that generates a prediction image by performing one of intra prediction and inter-screen prediction in each prediction unit (basic PU) having a size less than or equal to that of the basic CU, the basic PU being a unit obtained by dividing the output basic CU into at least one; a difference calculator that generates a difference image by calculating a difference between the generated prediction image and an image corresponding to the prediction image in the coding target picture; a residual coder that generates a residual coefficient by performing transform processing and quantization processing on the generated difference image; an integration unit that integrates a plurality of basic CUs included in an integration region (N×N-pixel region) into one new CU, (1) when pluralities of basic CUs and basic PUs belonging to the N×N-pixel region have an identical block size, and (2) when pieces of prediction information on the plurality of basic PUs belonging to the N×N-pixel region are identical to each other; and a code string generator that generates a code string corresponding to the post-integration new CU by performing variable-length coding and arithmetic coding on coding information and the residual coefficient, the coding information being set to the post-integration new CU, the residual coefficient relating to the plurality of pre-integration basic CUs belonging to the post-integration new CU.

BRIEF DESCRIPTION OF DRAWINGS

FIG. 1 is a conceptual view illustrating a combination of block sizes defined in an HEVC standard;

FIG. 6 is a conceptual view illustrating each block size combination that emerges by performing the integration determination processing of the first exemplary embodiment;

FIG. 9 is a conceptual view illustrating a condition of the integration determination processing of the second exemplary embodiment;

FIG. 10 is a conceptual view illustrating each block size combination that emerges by performing the integration determination processing of the second exemplary embodiment;

FIG. 11 is a flowchart illustrating integration determination processing according to a third exemplary embodiment;

FIG. 13 is a conceptual view illustrating each block size combination that emerges by performing the integration determination processing of the third exemplary embodiment.

DETAILED DESCRIPTION OF THE PREFERRED EMBODIMENTS

Hereinafter, exemplary embodiments of the present disclosure will be described in detail with reference to the drawings. However, the detailed description beyond necessity is occasionally omitted. For example, the detailed description of the well-known item or the overlapping description of the substantially same configuration is occasionally omitted. This is because unnecessary redundancy of the following description is avoided for the purpose of the easy understanding of those skilled in the art.

The accompanying drawings and the following description are provided in order that those skilled in the art sufficiently understand the present disclosure, but the claims are not limited to the accompanying drawings and the following description.

First Exemplary Embodiment

For example, video coding apparatus 100 according to a first exemplary embodiment is embodied by a microprocessor incorporated in a video camera, a digital camera, a video recorder, a mobile phone, a handheld terminal, and a personal computer. Video coding apparatus 100 of the first exemplary embodiment performs coding processing on video data according to an HEVC standard for video compression. Based on pieces of coding information on a CU (Coding Unit) and a PU (Prediction Unit), video coding apparatus 100 according to the present disclosure integrates the plurality of CUs into one CU, and provides one piece of header information to the post-integration CU. As a result, the code amounts of the pieces of header information on the CU layer and PU layer can be suppressed, and the coding efficiency can be improved without increasing the processing amount.

A configuration and operation of video coding apparatus 100 of the first exemplary embodiment will be described with reference to the drawings.

(1-1. Configuration of Video Coding Apparatus)

Figure 2:
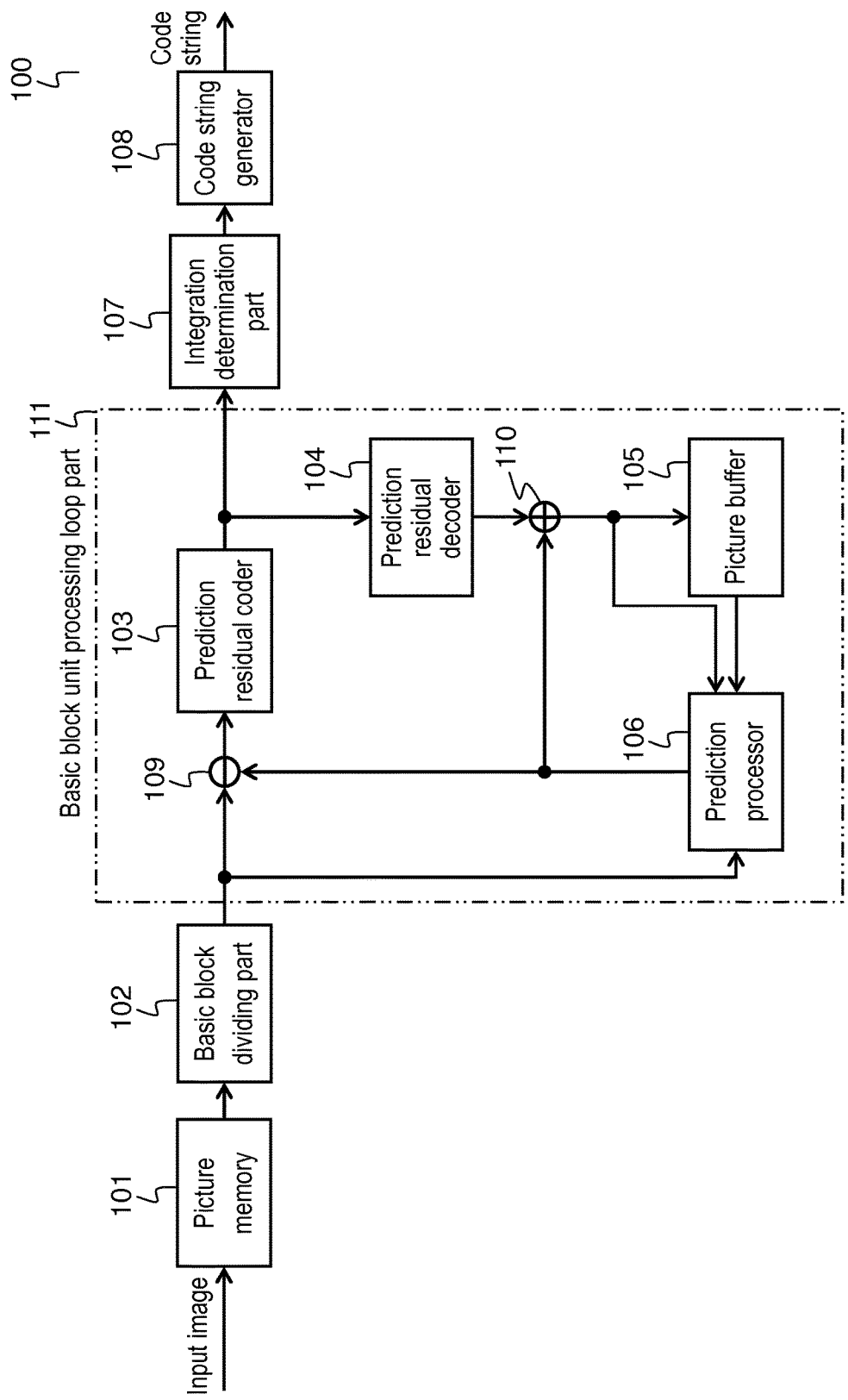
FIG. 2 is a block diagram illustrating a configuration of video coding apparatus 100 according to a first exemplary embodiment.

The configuration of video coding apparatus 100 will be described below. FIG. 2 is a block diagram illustrating the configuration of video coding apparatus 100 of the first exemplary embodiment.

As illustrated in FIG. 2, video coding apparatus 100 includes picture memory 101, basic block dividing part 102, basic block unit processing loop part 111, integration determination part 107, and code string generator 108. Video coding apparatus 100 also includes prediction residual coder 103, prediction residual decoder 104, picture buffer 105, prediction processor 106, difference calculator 109, and addition calculator 110 as basic block unit processing loop part 111. Video coding apparatus 100 having the above configuration divides an image input by picture unit into basic blocks, performs the coding processing by divided basic block unit, and outputs a code string.

Each unit constituting video coding apparatus 100 will be described below in detail.

An image signal is input into picture memory 101 by picture unit in the order displayed on a display device. The input image signal is stored, by picture unit in the coding order, in picture memory 101. When receiving a read command from basic block dividing part 102, picture memory 101 outputs a coding target picture that is of the input image signal concerning the read command to basic block dividing part 102.

Figure 3:
FIG. 3 is a conceptual view illustrating a combination of block sizes of the first exemplary embodiment.

Basic block dividing part 102 that is of the dividing part, divides the coding target picture sequentially input from picture memory 101 for each coding unit, and outputs the coding target picture. Basic block dividing part 102 divides the coding target picture into the basic blocks that is of a basic unit of processing in basic block unit processing loop part 111. Video coding apparatus 100 limits a basic block size to 16×16 pixels, which are smaller than 64×64 pixels and 32×32 pixels. The 64×64 pixels, 32×32 pixels, and 16×16 pixels are defined in the HEVC standard. The basic block includes at least one CU that is of a coding unit defined in the HEVC standard. FIG. 3 is a conceptual view illustrating a combination of block sizes of the first exemplary embodiment. As illustrated in a column of a "basic CU size" in FIG. 3, the basic CU size can take on a 16×16-pixel size and an 8×8-pixel size with respect to the 16×16-pixel basic block. One CU having the 16×16-pixel size is included in the 16×16-pixel basic block. Four CUs having the 8×8-pixel size are included in the 16×16-pixel basic block. Hereinafter, these CUs included in the basic block are referred to as a "basic CU".

Basic block dividing part 102 selects a basic CU size and divides the input coding target picture into the basic blocks. Generally, basic block dividing part 102 selects the basic CU having a smaller size when the coding target picture has a complicated pixel configuration. On the other hand, basic block dividing part 102 selects the basic CU having a larger size when the coding target picture has a simple pixel configuration. The same holds true for the case that a part of the sizes of the basic CUs in FIG. 3 is not used or the case that the basic CU having the size, which is not illustrated in FIG. 3 but is less than or equal to the basic block size, is used.

Basic block dividing part 102 outputs the coding target picture divided into the basic blocks (in which the basic CU size is already selected) to prediction processor 106 and difference calculator 109.

Based on the coding target picture divided into the basic blocks sequentially input from basic block dividing part 102, prediction processor 106 performs prediction processing on each basic block using one of intra prediction and inter-screen prediction. Prediction processor 106 performs prediction processing on each PU (hereinafter, referred to as a "basic PU") that is one of prediction units into which the basic CU is further divided. Specifically, as illustrated in the column of a "basic PU size" in FIG. 3, the basic CU having the 16×16-pixel size is divided into one of one 16×16-pixel basic PU, two 16×8-pixel basic PUs, and two 8×16-pixel basic PUs. However, the 16×8-pixel and 8×16-pixel basic PU sizes are used only when the inter-screen prediction is selected. On the other hand, the basic CU having the 8×8-pixel size is divided into one of one 8×8-pixel basic PU, two 8×4-pixel basic PUs or two 4×8-pixel basic PUs, and four 4×4-pixel basic PUs. However, the 8×4-pixel and 4×8-pixel basic PU sizes are used only when the inter-screen prediction is selected. The 4×4-pixel basic PU size is used only when the intra prediction is selected. Generally, prediction processor 106 selects the basic PU having a smaller size when the input basic CU has the complicated pixel configuration. On the other hand, prediction processor 106 selects the basic PU having a larger size when the input basic CU has the simple pixel configuration. The same holds true for the case that a part of the sizes of the basic PUs in FIG. 3 is not used or the case that the basic PU having the size, which is not illustrated in FIG. 3 but is less than or equal to the basic CU, is used.

In the case that the intra prediction is used, prediction processor 106 performs the prediction processing on the block in the coding target picture using a reconstructed image signal of an already-coded surrounding block in the same coding target picture. As used herein, the reconstructed image signal means a signal generated by addition calculator 110 (to be described later). Prediction processor 106 performs the prediction processing by selecting one intra prediction mode of generating a prediction image having a highest similarity of the pixel configuration to that of the coding target block from a plurality of intra prediction methods (intra prediction modes).

On the other hand, in the case that the inter-screen prediction is used, prediction processor 106 performs the prediction processing using the reconstructed image signal of another already-coded picture stored in picture buffer 105. Specifically, prediction processor 106 searches a region having the highest similarity of the pixel configuration to that of the coding target block from a reconstructed image of another already-coded picture. Prediction processor 106 fixes which one of the reconstructed images of the pictures is referred to (hereinafter, information on the picture to be referred to is referred to as "reference picture information"), and fixes how far the reconstructed image to be referred to is deviated from a position corresponding to the coding target block (hereinafter, information indicating a position deviation amount is referred to as "motion vector information") in the reference picture, thereby generating the prediction image.

Difference calculator 109 generates a difference image signal that is of a difference value between a basic-PU input image signal selected based on the basic CU in the basic block input from basic block dividing part 102 and a basic-PU prediction image signal input from prediction processor 106. Difference calculator 109 outputs the generated difference image signal to prediction residual coder 103.

Prediction residual coder 103 that is of the residual coder performs transform processing on the difference image signal input from difference calculator 109, and performs quantization processing on an transform coefficient of each obtained frequency component. As a result, prediction residual coder 103 generates a residual coefficient signal. Prediction residual coder 103 performs the transform processing and the quantization processing in each TU (Transform Unit) (hereinafter, referred to as a "basic TU") that is one of transform units into which the basic CU is further divided. Specifically, as illustrated in the column of a "basic TU size" in FIG. 3, the basic CU having the 16×16-pixel size is divided into one of one 16×16-pixel basic TU and four 8×8-pixel basic TUs. On the other hand, the basic CU having the 8×8-pixel size can be divided into one of one 8×8-pixel basic TU or four 4×4-pixel basic TUs. In the example of FIG. 3, necessity of the processing of selecting the basic TU size is eliminated, because the basic TU is uniquely allocated when the basic PU is fixed. Therefore, the processing amount can considerably be reduced. The same holds true for the case that a part of the sizes of the basic TUs in FIG. 3 is not used or the case that the basic TU having the size, which is not illustrated in FIG. 3 but is less than or equal to the basic PU, is used.

In prediction residual decoder 104, the basic TU processed by prediction residual coder 103 is set to the processing unit. Prediction residual decoder 104 performs inverse quantization processing and inverse transform processing on the residual coefficient signal input from prediction residual coder 103, thereby generating a reconstructed difference image signal.

Addition calculator 110 generates the reconstructed image signal by adding the reconstructed difference image signal input from prediction residual decoder 104 and the prediction image signal input from prediction processor 106 by basic PU.

The reconstructed image signal input from addition calculator 110 is stored in picture buffer 105. The reconstructed image signal stored in picture buffer 105 is referred to in the inter-screen prediction processing performed on a picture coded after the present coding target picture.

At time basic block unit processing loop part 111 completes a series of pieces of processing performed on the plurality of basic blocks that are of the integration determination target, integration determination part 107 acting as the integration unit determines whether the basic CUs belonging to the plurality of basic blocks are integrated into one integrated coding unit (hereinafter, referred to as an "integrated CU"), and generates an integration determination result signal. That is, integration determination part 107 determines whether the plurality of basic CU belonging to an N×N-pixel (for example, 32×32-pixel) region constructed with the plurality of basic blocks are integrated into one integrated CU. Integration determination part 107 has a first operation mode in which the plurality of basic CUs are directly output to code string generator 108 without integrating the basic CUs and a second operation mode in which the plurality of basic CUs belonging to the N×N-pixel region are integrated into one new CU before they are output to code string generator 108. Integration determination part 107 switchably performs the first operation mode and the second operation mode according to the integration determination result. That is, integration determination part 107 integrates the plurality of basic CUs included in the N×N- pixel region into one new CU, (1) when the pluralities of basic CUs and basic PUs belonging to the N×N-pixel region have the identical block size, and (2) when pieces of prediction information on the plurality of basic PUs belonging to the N×N-pixel region are identical to each other.

Code string generator 108 generates a code string by performing variable-length coding and arithmetic coding on the residual coefficient signal input from prediction residual coder 103 by integrated CU or basic CU and coding information signal necessary for processing of decoding other signals according to the integration determination result signal input from integration determination part 107. That is, code string generator 108 generates the code string with respect to the new post-integration CU by performing the variable-length coding and the arithmetic coding on the coding information set to the new post-integration CU and the residual coefficient concerning the plurality of pre-integration basic CUs belonging to the new post-integration CU. In the case that the integrated CU is output from integration determination part 107, the code string is generated with respect to the integrated CU by performing the variable-length coding and the arithmetic coding on the coding information set to the integrated CU and the residual coefficient concerning the plurality of pre-integration basic CUs belonging to the integrated CU.

As described above, in video coding apparatus 100, the basic block size is limited to the 16×16 pixels. As illustrated in FIG. 3, selectable combinations of the basic CUs, basic PUs, and basic TUs can be limited to three sets when the intra prediction is selected, and the selectable combinations can be limited to six sets when the inter-screen prediction is selected. Therefore, the processing amount necessary for the selection of the optimum combination in the series of pieces of processing performed by basic block unit processing loop part 111 can significantly be reduced.

In the first exemplary embodiment, the basic block size is limited to the 16×16 pixels. Alternatively, the basic block size is not limited, but the optimum combination may be selected from the combinations in FIG. 1 defined in the HEVC standard. However, in this case, the processing amount becomes huge compared with the case that the basic block size is limited. Alternatively, the basic block size is not limited to the 16×16 pixels, but the basic block size may be limited to other block sizes such as the 32×32 pixels. For example, in the case that the basic block size is limited to the 32×32 pixels, the number of options of the block sizes of the CU and PU belonging to the basic block size is increased to be expected to improve the coding efficiency. On the other hand, the processing amount necessary for the selection of the optimum CU and PU block sizes is increased. Accordingly, the larger block size is used as the basic block size in the video coding apparatus in which the increase of processing amount is acceptable. On the other hand, the smaller block size is used as the basic block size in the video coding apparatus in which the increase of processing amount is unacceptable.

(1-2. Operation of Integration Determination Part)

An integration region including the plurality of basic blocks is defined in integration determination part 107 of the first exemplary embodiment. At the time basic block unit processing loop part 111 completes the series of pieces of processing, integration determination part 107 performs integration determination processing on all the basic blocks included in the integration region.

Figure 4:
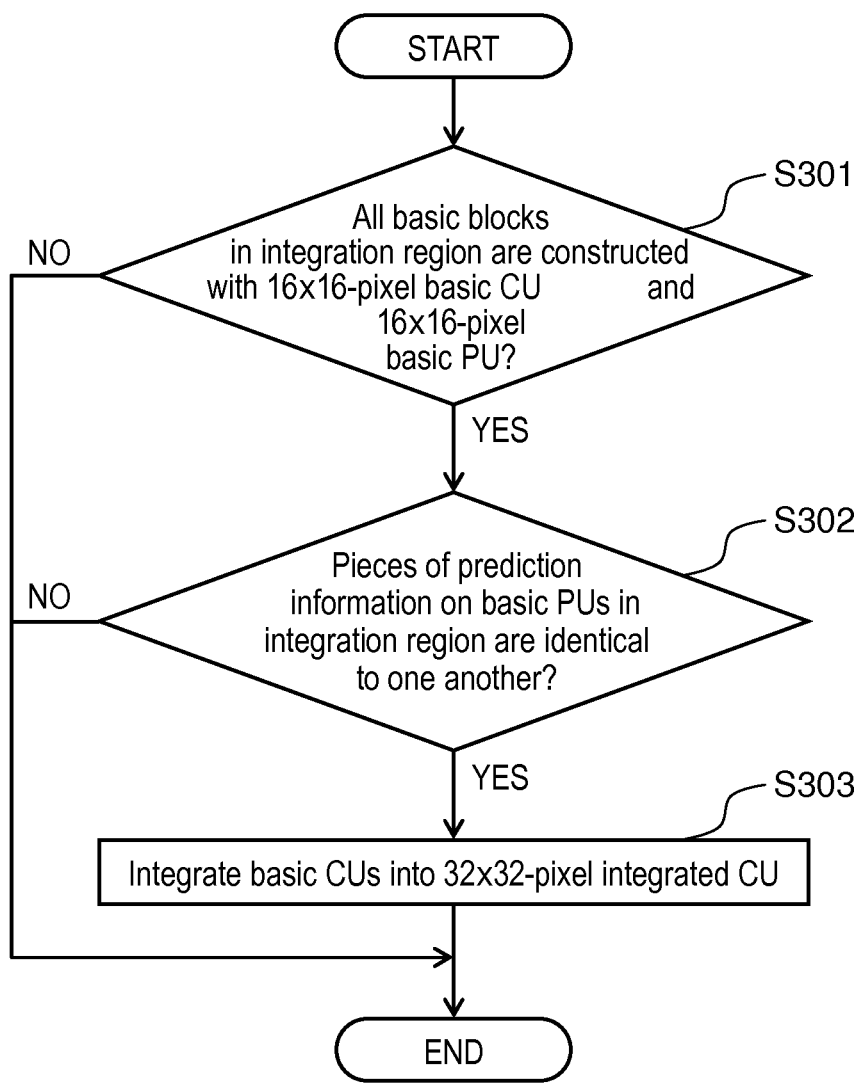
FIG. 4 is a flowchart illustrating integration determination processing of the first exemplary embodiment.
Figure 5B:
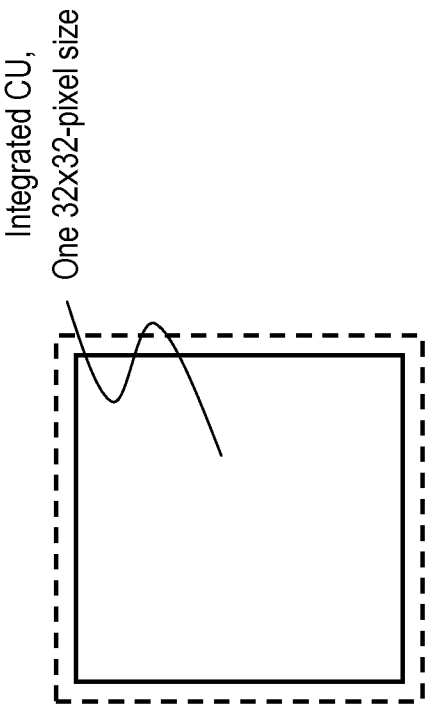
FIG. 5B is a view illustrating the integration determination processing of the first exemplary embodiment.
Figure 5A:
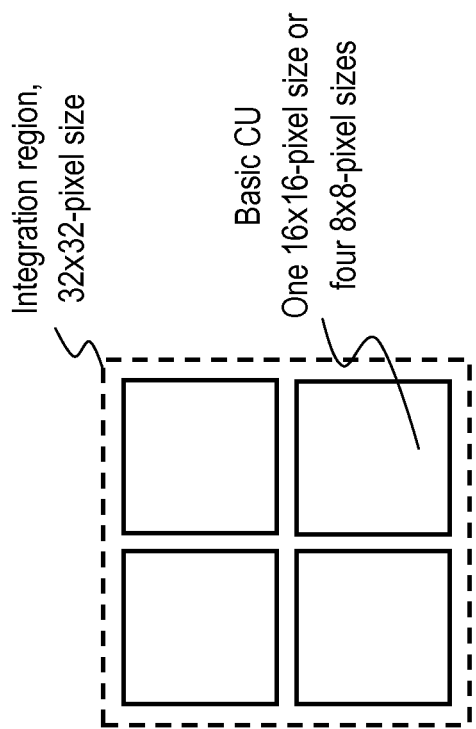
FIG. 5A is a view illustrating the integration determination processing of the first exemplary embodiment.

A method, performed by integration determination part 107, for determining whether the basic CUs belonging to the plurality of basic blocks are integrated into one integrated CU will specifically be described with reference to FIGS. 4, 5A, and 5B. FIG. 4 is a flowchart illustrating the integration determination processing of the first exemplary embodiment. FIGS. 5A and 5B are views illustrating the integration determination processing of the first exemplary embodiment. FIG. 4 illustrates the processing in the case that the basic block has the 16×16-pixel size while the integration region has the 32×32-pixel size. At this point, the integration region includes four basic blocks. As long as an integration region size is larger than the basic block size, a size except the 32×32 pixels may be used as the integration region size according to the basic block size.

Integration determination part 107 determines whether all the four basic blocks included in the integration region are constructed with the 16×16-pixel basic CU and the 16×16-pixel basic PU (S301).

When the condition in S301 is not satisfied (NO in S301), the basic CUs in the integration region are not integrated as illustrated in FIG. 5A.

On the other hand, when the condition in S301 is satisfied (YES in S301), integration determination part 107 determines whether pieces of prediction information on the four basic PUs in the integration region are identical to one another (S302). Specifically, for the intra prediction, integration determination part 107 determines whether at least the intra prediction modes of the four basic PUs in the integration region are identical to one another. That is, integration determination part 107 switches between the first operation mode and the second operation mode based on whether the intra prediction modes are identical to one another as the prediction information, when all the basic PUs included in the integration region are the intra prediction. On the other hand, for the inter-screen prediction, integration determination part 107 determines whether at least pieces of motion vector information and pieces of reference picture information on the four basic PUs in the integration region are identical to one another. That is, integration determination part 107 switches between the first operation mode and the second operation mode based on whether the pieces of motion vector information and pieces of reference picture information are identical to one another as the prediction information, when all the basic PUs included in the integration region are the inter-screen prediction.

When the condition in S302 is not satisfied (NO in S302), the basic CUs in the integration region are not integrated as illustrated in FIG. 5A.

On the other hand, when the condition in S302 is satisfied (YES in S302), integration determination part 107 integrates the four 16×16-pixel basic CUs into the one 32×32-pixel integrated CU as illustrated in FIG. 5B (S303).

FIG. 6 is a conceptual view illustrating each block size combination that emerges by performing the integration determination processing of the first exemplary embodiment. These block sizes become variable-length coding and arithmetic coding targets in code string generator 108. When compared with the example in FIG. 3, it is found that the integrated CU having the CU size of 32×32 pixels, the PU size of 32×32 pixels, and the TU size of 16×16 pixels is added by the integration determination processing.

Thus, in video coding apparatus 100 of the first exemplary embodiment, integration determination part 107 integrates the plurality of basic CUs included in the integration region into one new CU, when all the pluralities of basic CUs and basic PUs belonging to the integration region (the N×N-pixel region constructed with the plurality of basic blocks) have the identical block size, and when pieces of prediction information on all the basic PUs included in the integration region are identical to each other. The code string is generated based on the post-integration new CU.

In the case that the integration processing in FIG. 4 is not performed, even if the basic PUs have the identical prediction information, it is necessary to individually write the prediction information on each basic PU in the code string. Therefore, the code amounts of the pieces of header information on the CU layer and PU layer are wastefully generated. On the other hand, in the case that the integration processing is performed, it is only necessary to write the integrated one piece of prediction information in the code string, so that the code amounts of the pieces of header information on the CU layer and PU layer can be suppressed, and the coding efficiency can be improved without increasing the processing amount.

Integration determination part 107 integrates only the CUs and the PUs in the integrated CU. On the other hand, integration determination part 107 does not integrate the TUs. Therefore, it is not necessary to reconstruct the residual coefficient signal after the integration, but the basic CU can be converted into the integrated CU only by changing the pieces of header information on the CU layer and PU layer.

Second Exemplary Embodiment

Video coding apparatus 100 according to a second exemplary embodiment will be described with reference to the drawings. Because the configuration of video coding apparatus 100 of the second exemplary embodiment is similar to that of the first exemplary embodiment, the description is omitted.

Video coding apparatus 100 of the second exemplary embodiment differs from video coding apparatus 100 of the first exemplary embodiment in the integration determination processing performed by integration determination part 107.

Figure 7:
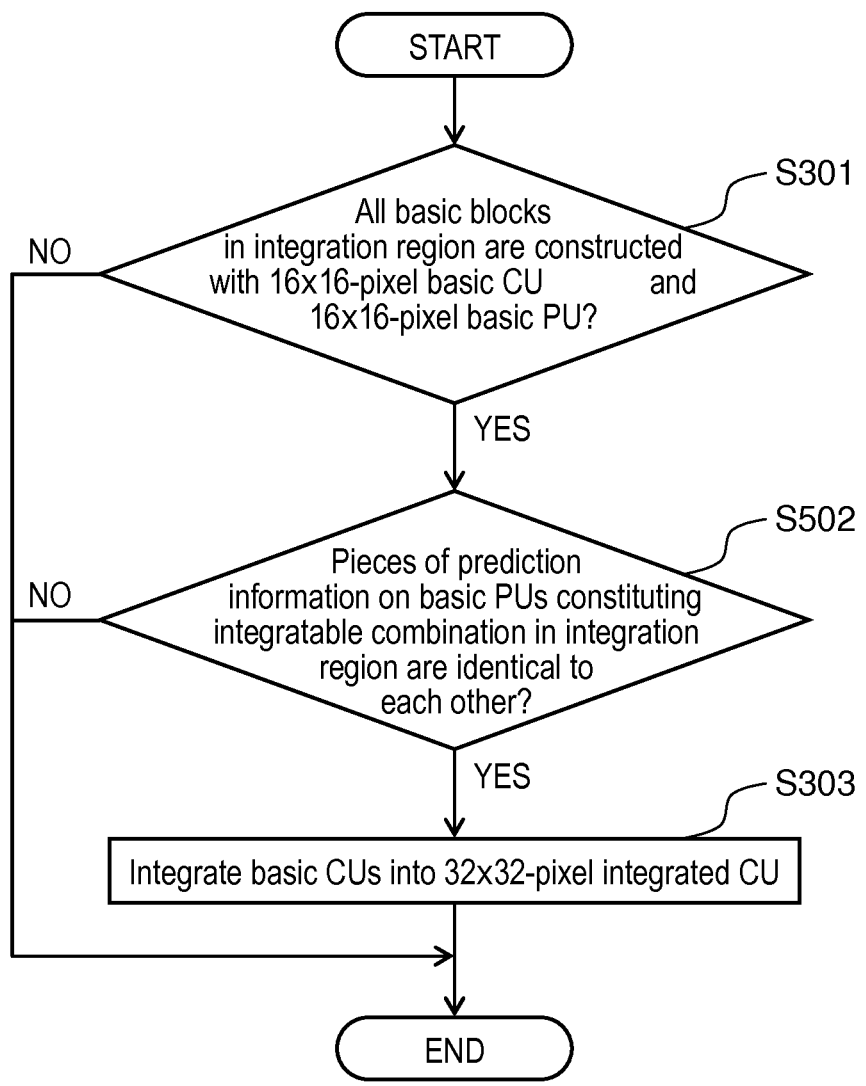
FIG. 7 is a flowchart illustrating integration determination processing according to a second exemplary embodiment.
Figure 8A:
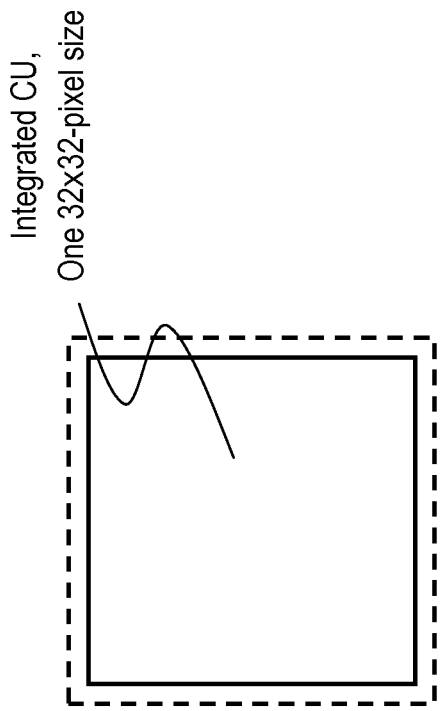
FIG. 8A is a view illustrating the integration determination processing of the second exemplary embodiment.
Figure 8B:
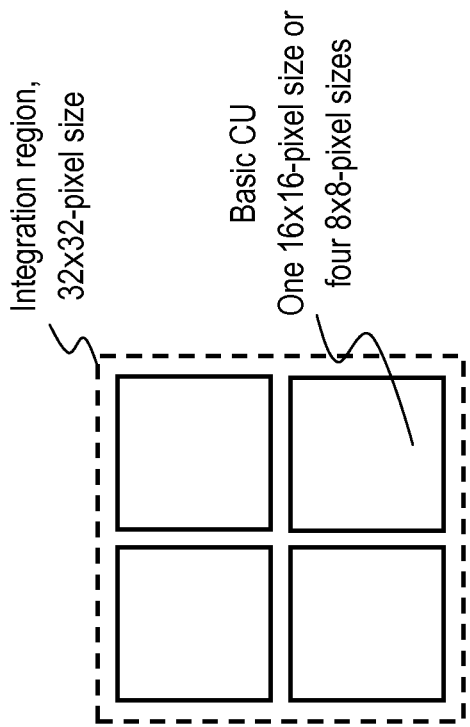
FIG. 8B is a view illustrating the integration determination processing of the second exemplary embodiment.

FIG. 7 is a flowchart illustrating the integration determination processing of the second exemplary embodiment. FIGS. 8A and 8B are views illustrating the integration determination processing of the second exemplary embodiment. FIG. 7 illustrates the processing in the case that the basic block has the 16×16-pixel size while the integration region has the 32×32-pixel size. At this point, the integration region includes four basic blocks.

Integration determination part 107 determines whether all the four basic blocks included in the integration region are constructed with the 16×16-pixel basic CU and the 16×16-pixel basic PU (S301). When the condition in S301 is not satisfied (NO in S301), the basic CUs in the integration region are not integrated as illustrated in FIG. 8A. On the other hand, when the condition in S301 is satisfied (YES in S301), integration determination part 107 determines whether pieces of prediction information only on the basic PUs constituting an integratable combination of the four basic PUs in the integration region are identical to each other (S502 in FIG. 7). The detailed determination in S502 of FIG. 7 will be described with reference to FIG. 9.

FIG. 9 is a conceptual view illustrating a condition of the integration determination processing of the second exemplary embodiment. As illustrated in FIG. 9, in the case that the pieces of prediction information on the four basic PUs are identical to one another, integration determination part 107 integrates the four basic PUs into one 32×32-pixel integrated PU. In the case that the pieces of prediction information on two sets of basic PUs horizontally adjacent to each other are identical to each other although the pieces of prediction information on the four basic PUs are different from one another, integration determination part 107 integrates the two basic PUs on the upper side into the integrated PU having the 32×16 pixels, and integrates the two basic PUs on the lower side into the integrated PU having the 32×16 pixels. In the case that the pieces of prediction information on two sets of basic PUs vertically adjacent to each other are identical to each other although the pieces of prediction information on the four basic PUs are different from one another, integration determination part 107 integrates the two basic PUs on the left side into the integrated PU having the 16×32 pixels, and integrates the two basic PUs on the right side into the integrated PU having the 16×32 pixels. The 32×16-pixel integrated PU and the 16×32-pixel integrated PU can be selected only for the inter-screen prediction, and only the 32×32-pixel integrated PU can be selected for the intra prediction.

In the integration determination processing of the second exemplary embodiment, the plurality of basic PUs included in the integration region (N×N-pixel region) are integrated into one new PU, when the plurality of basic PUs belonging to the integration region are divided into groups each of which is constructed with two basic PUs adjacent to each other, and when the pieces of prediction information on the basic PUs belonging to each group are identical to each other. In this case, integration determination part 107 integrates the four 16×16-pixel basic CUs into the one 32×32-pixel integrated CU as illustrated in FIG. 8B (S303 in FIG. 7).

FIG. 10 is a conceptual view illustrating each block size combination that emerges by performing the integration determination processing of the second exemplary embodiment. These block sizes become variable-length coding and arithmetic coding targets in code string generator 108. When compared with the example in FIG. 3, it is found that the integrated CU having the CU size of 32×32 pixels, the PU size of 32×32 pixels, and the TU size of 16×16 pixels and the integrated CU having the CU size of 32×32 pixels, the PU size of 32×16 pixels or 16×32 pixels, and the TU size of 16×16 pixels are added by the integration determination processing.

In video coding apparatus 100 of the second exemplary embodiment, integration determination part 107 integrates the plurality of basic CUs included in the integration region (N×N-pixel region) into one new CU, when the plurality of basic PUs belonging to the integration region are divided into groups of two basic PUs adjacent to each other, and when the pieces of prediction information on the basic PUs belonging to each group are identical to each other. The code string is generated based on the post-integration new CU.

For example, integration determination part 107 integrates the plurality of basic CUs included in the integration region (N×N-pixel region) into one new CU, when the pieces of prediction information on all the basic PUs included in an upper half region in the integration region are identical to each other, and when the pieces of prediction information on all the basic PUs included in a lower half region in the integration region are identical to each other. Alternatively, integration determination part 107 integrates the plurality of basic CUs included in the integration region (N×N-pixel region) into one new CU, when the pieces of prediction information on all the basic PUs included in a half region on the left side in the integration region are identical to each other, and when the pieces of prediction information on all the basic PUs included in a half region on the right side in the integration region are identical to each other.

In the integration processing of the first exemplary embodiment, the four basic CUs are integrated into the integrated CU only when all the pieces of prediction information on the basic PUs are identical to one another. On the other hand, in the integration processing of the second exemplary embodiment, the basic CUs are integrated into the integrated CU even when the pieces of prediction information on the two sets of basic PUs are identical to each other, so that the more basic CUs can be integrated. Therefore, the code amounts of the pieces of header information on the CU layer and PU layer can further be suppressed, and the coding efficiency can be improved without increasing the processing amount.

Integration determination part 107 integrates only the CUs and the PUs in the integrated CU. On the other hand, integration determination part 107 does not integrate the TUs. Therefore, it is not necessary to reconstruct the residual coefficient signal after the integration, but the basic CU can be converted into the integrated CU only by changing the pieces of header information on the CU layer and PU layer.

Third Exemplary Embodiment

Video coding apparatus 100 according to a third exemplary embodiment will be described with reference to the drawings. Because the configuration of video coding apparatus 100 of the third exemplary embodiment is similar to that of the first exemplary embodiment, the description is omitted.

Video coding apparatus 100 of the third exemplary embodiment differs from video coding apparatus 100 of the first and second exemplary embodiments in the integration determination processing performed by integration determination part 107.

In integration determination part 107 of the third exemplary embodiment, a two-stage integration region of integration region 1 and integration region 2 is defined as the integration region including the plurality of basic blocks. At the time basic block unit processing loop part 111 completes the series of pieces of processing, integration determination part 107 performs integration determination processing on all the basic blocks included in the integration region.

Figure 12A:
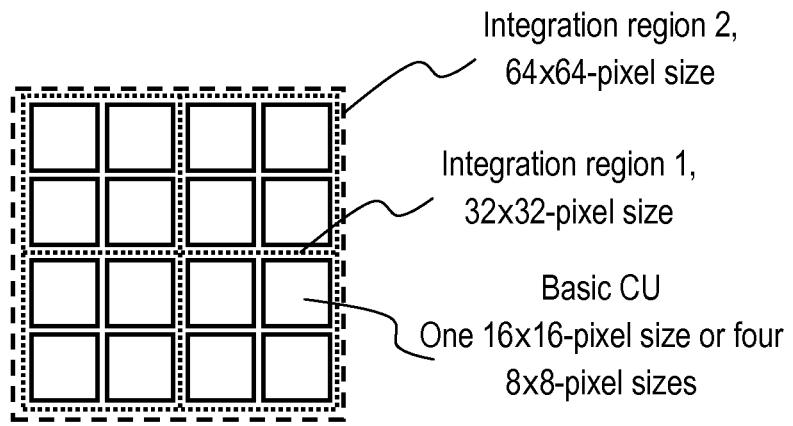
FIG. 12A is a view illustrating the integration determination processing of the third exemplary embodiment.
Figure 12B:
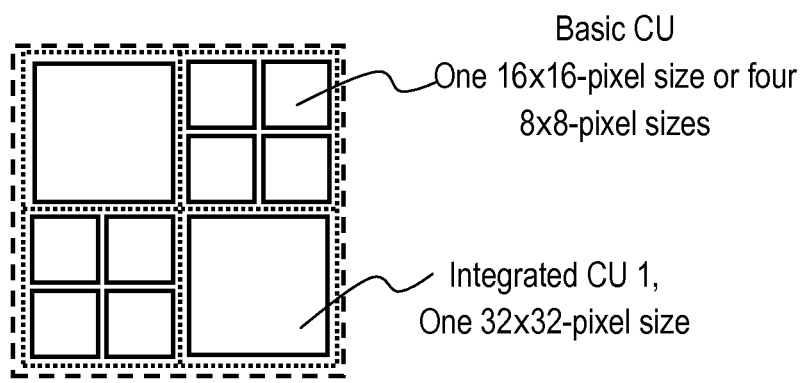
FIG. 12B is a view illustrating the integration determination processing of the third exemplary embodiment.
Figure 12C:
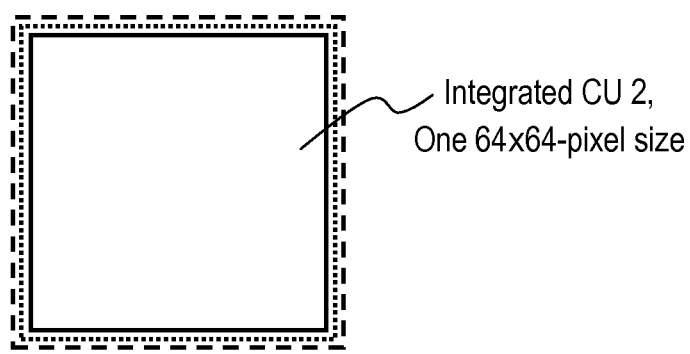
FIG. 12C is a view illustrating the integration determination processing of the third exemplary embodiment.

A method, performed by integration determination part 107, for determining whether the basic CUs belonging to the plurality of basic blocks are integrated into one integrated CU will specifically be described with reference to FIGS. 11, 12A, 12B, and 12C. FIG. 11 is a flowchart illustrating the integration determination processing of the third exemplary embodiment. FIGS. 12A, 12B, and 12C are views illustrating the integration determination processing of the third exemplary embodiment. FIG. 11 illustrates the processing in the case that the basic block has the 16×16-pixel size, that integration region 1 has the 32×32-pixel size, and that integration region 2 has the 64×64-pixel size. Integration region 2 includes integration region 1. At this point, integration region 1 includes four basic blocks. Integration region 2 includes four integration regions 1. That is, integration region 2 includes 16 basic blocks. As long as the integration region size is larger than the basic block size, a size except the 32×32 pixels and 64×64 pixels may be used as the integration region size according to the basic block size.

Integration determination part 107 determines whether all the four basic blocks included in integration region 1 are constructed with the 16×16-pixel basic CU and the 16×16-pixel basic PU (S801).

When the condition in S801 is not satisfied (NO in S801), the basic CUs in integration region 1 are not integrated as illustrated in FIG. 12A.

On the other hand, when the condition in S801 is satisfied (YES in S801), integration determination part 107 determines whether pieces of prediction information on the four basic PUs in integration region 1 are identical to one another (S802). Specifically, for the intra prediction, integration determination part 107 determines whether at least the intra prediction modes of the four basic PUs in integration region 1 are identical to one another. On the other hand, for the inter-screen prediction, integration determination part 107 determines whether at least the pieces of motion vector information and pieces of reference picture information on the four basic PUs in integration region 1 are identical to one another.

When the condition in S802 is not satisfied (NO in S802), the basic CUs in integration region 1 are not integrated as illustrated in FIG. 12A.

On the other hand, when the condition in S802 is satisfied (YES in S802), integration determination part 107 integrates the four 16×16-pixel basic CUs into the one 32×32-pixel integrated CU 1 (S803).

Integration determination part 107 determines whether a series of pieces of processing in S801 to S803 is performed on all four integration regions 1 belonging to integration region 2 (S804). That is, when the series of pieces of processing in S801 to S803 is not completed with respect to all integration regions 1 in integration region 2 (NO in S804), integration determination part 107 performs the series of pieces of processing in S801 to S803 on unprocessed integration region 1. As a result, in the case that the integration processing is not performed on any integration region 1, the 16 basic CUs in integration region 2 are not integrated as illustrated in FIG. 12A. On the other hand, in the case that only a part of four integration regions 1 is integrated, only some basic CUs in integration region 2 are integrated into 32×32-pixel integrated CU 1 as illustrated in FIG. 12B.

When the series of pieces of processing in S801 to S803 is completed with respect to all integration regions 1 in integration region 2 (YES in S804), integration determination part 107 determines whether all the basic CUs are integrated into integrated CU 1 with respect to four integration regions 1 belonging to integration region 2 (S805).

When the condition in S805 is not satisfied (NO in S805), integration determination part 107 ends the integration determination processing.

When the condition in S805 is satisfied (YES in S805), integration determination part 107 determines whether the pieces of prediction information on the four integrated PUs 1 in integration region 2 are identical to one another (S806).

When the condition in S806 is not satisfied (NO in S806), integration determination part 107 ends the integration determination processing.

When the condition in S806 is satisfied (YES in S806), integration determination part 107 further integrates four 32×32-pixel integrated CUs 1 into one 64×64-pixel integrated CU 2 as illustrated in FIG. 12C (S807). Video coding apparatus 100 limits the basic block size to 16×16 pixels, which are smaller than 64×64 pixels and 32×32 pixels. The 64×64 pixels, 32×32 pixels, and 16×16 pixels are defined in the HEVC standard. Therefore, the integration into 32×32-pixel integrated CU 1 and the integration into 64×64-pixel integrated CU 2 can be achieved.

FIG. 13 is a conceptual view illustrating each block size combination that emerges by performing the integration determination processing of the third exemplary embodiment. These block sizes become variable-length coding and arithmetic coding targets in code string generator 108. When compared with the example in FIG. 3, it is found that the integrated CU 1 having the CU size of 32×32 pixels, the PU size of 32×32 pixels, and the TU size of 16×16 pixels and the integrated CU 2 having the CU size of 64×64 pixels, the PU size of 64×64 pixels, and the TU size of 16×16 pixels are added by the integration determination processing.

Thus, in video coding apparatus 100 of the third exemplary embodiment, integration determination part 107 integrates the plurality of basic CUs included in the integration region 1 into one new integrated CU 1, when all the pluralities of basic CUs and basic PUs belonging to integration region 1 (the N×N-pixel region constructed with the plurality of basic blocks) have the identical block size, and when the pieces of prediction information on all the basic PUs included in integration region 1 are identical to one another. Integration determination part 107 also integrates the plurality of basic CUs included in integration region 2 into one new integrated CU 2, when all the basic CUs in integration region 2 (the region constructed with the plurality of integration regions 1) are integrated into integrated CU 1, and when the pieces of prediction information on all the integrated PUs 1 in integration region 2 are identical to one another. The code string is generated based on the post-integration new CU.

In the integration processing of the first exemplary embodiment, only four basic CUs are integrated at a maximum. On the other hand, in the integration processing of the third exemplary embodiment, the integration is performed up to 16 basic CUs, so that the more basic CUs can be integrated into one CU. Therefore, the code amounts of the pieces of header information on the CU layer and PU layer can further be suppressed, and the coding efficiency can be improved without increasing the processing amount.

Integration determination part 107 integrates only the CUs and the PUs in integrated CU 1 and integrated CU 2. On the other hand, integration determination part 107 does not integrate the TUs. Therefore, it is not necessary to reconstruct the residual coefficient signal after the integration, but the basic CU can be converted into integrated CU 1 and integrated CU 2 only by changing the pieces of header information on the CU layer and PU layer.

Other Exemplary Embodiments

By way of example, the first to third exemplary embodiments are described above as the technology disclosed in the present disclosure. However, the technology disclosed in the present disclosure is not limited to the first to third exemplary embodiments, but can be applied to exemplary embodiments in which modifications, replacements, additions, and omission are performed. A new exemplary embodiment can be made by a combination of constituents described in the first to third exemplary embodiments.

Other exemplary embodiments will be described below.

The integration determination processing of each of the first to third exemplary embodiments is not limited to the individual use. That is, in the integration determination processing of each of the first to third exemplary embodiments, some of the plurality of pieces of processing may be combined and used. For example, in the flowchart of the third exemplary embodiment in FIG. 11, one of or both Steps S802 and S805 may be replaced with Step S502 in the flowchart of the second exemplary embodiment in FIG. 7.

A program having a function equivalent to each part included in video coding apparatus 100 of the first to third exemplary embodiments may be recorded in a recording medium such as a flexible disk. Therefore, the pieces of processing in the first to third exemplary embodiments can easily be performed by an independent computer system. The recording medium is not limited to the flexible disk, but any recording medium such as an optical disk, an IC card, and a ROM cassette may be used as long as the program is recorded in the recording medium.

The function equivalent to each part included in video coding apparatus 100 of the first to third exemplary embodiments may be implemented as an LSI that is of an integrated circuit. A part of or all the parts may be integrated into one chip. The LSI is also called an IC, a system LSI, a super LSI, and an ultra LSI depending on an integration level.

The integrated circuit technique is not limited to the LSI, but the function may be implemented by a dedicated circuit or a general-purpose processor. An FPGA (Field Programmable Gate Array) that can be programmed after the production of the LSI or a reconfigurable processor that can reconfigure connection or setting of a circuit cell in the LSI may be used.

When an integrated circuit technology that replaces the LSI appears by a progress of a semiconductor technology or another derived technology, the functional block may be integrated using the integrated circuit technology that replaces the LSI.

Because the first to third exemplary embodiments are described only in order to illustrate the technology of the present disclosure, various changes, replacements, additions, and omissions can be made within the claims and the range equivalent to the claims.

The present disclosure can be applied to the video coding apparatus that codes each picture constituting the input image and outputs the picture as the video coding data. For example, the present disclosure can be applied to a video camera, a digital camera, a video recorder, a mobile phone, a handheld terminal, and a personal computer.

What is claimed is:

1. A video coding apparatus that codes a current picture to generate a code string, the video coding apparatus comprising:
a block practitioner which, in operation, (i) divides the current picture into a plurality of coding units and (ii) respectively divides the plurality of coding units into at least one prediction unit;
a residual coder which, in operation, generates a residual component by calculating a difference between a prediction image which is generated for each of the prediction unit and the current picture;
wherein only when a first size of a first coding unit of the plurality of coding unit is 2N×2N, a second size of a prediction unit in the first coding unit is always one of 2N×2N, 2N×N, and N×2N, and
wherein when the first size of the first coding unit of the plurality of coding unit is not 2N×2N, the second size of the prediction unit in the first coding unit is one of 2N×2N, 2N×N, N×2N, and N×N.

2. The video coding apparatus according to claim 1, wherein when the first size of the first coding unit of the plurality of coding unit is 2N×2N, a third size of a transform unit in the first coding unit is (i) always 2N×2N when the second size of the prediction unit in the first coding unit is 2N×2N and (ii) always N×N when the second size of the prediction unit in the first coding unit is 2N×N or N×2N.

3. The video coding apparatus according to claim 1, wherein when (i) when the first size of the first coding unit of the plurality of coding unit is 2N×2N and (ii) inter prediction is to be performed, the second size of the prediction unit in the first coding unit is always one of 2N×N and N×2N.

4. A video coding apparatus that codes a current picture to generate a code string, the video coding apparatus comprising:

a block practitioner which, in operation, (i) divides the current picture into a plurality of coding units and (ii) respectively divides the plurality of coding units into at least one prediction unit;

a residual coder which, in operation, generates a residual component by calculating a difference between a prediction image which is generated for each of the prediction unit and the current picture;

wherein only when a first size of a first coding unit of the plurality of coding unit is 4N×4N, a second size of a prediction unit in the first coding unit is (i) always 4N×4N when intra prediction is to be performed and (ii) always one of 4N×4N, 4N×2N, and 2N×4N when inter prediction is to be performed, and wherein when the first size of the first coding unit of the plurality of coding unit is not 2N×2N, the second size of the prediction unit in the first coding unit is one of 2N×2N, 2N×N, N×2N, and N×N, and wherein when the first size of the first coding unit of the plurality of coding unit is 2N×2N, the second size of the prediction unit in the first coding unit is (i) always one of 2N×2N and N×N when intra prediction is to be performed and (ii) always one of 2N×2N, 2N×N, and N×2N when inter prediction is to be performed.

* * * * *